United States Patent
Zhang

(10) Patent No.: US 9,963,594 B2
(45) Date of Patent: May 8, 2018

(54) MODIFIED CARBON BLACK AND PREPARATION METHOD THEREFOR

(71) Applicant: Yigang Zhang, Shanghai (CN)

(72) Inventor: Yigang Zhang, Shanghai (CN)

( * ) Notice: Subject to any disclaimer, the term of this patent is extended or adjusted under 35 U.S.C. 154(b) by 0 days. days.

(21) Appl. No.: 15/027,630

(22) PCT Filed: Aug. 29, 2014

(86) PCT No.: PCT/CN2014/085517
§ 371 (c)(1),
(2) Date: Apr. 6, 2016

(87) PCT Pub. No.: WO2015/051683
PCT Pub. Date: Apr. 16, 2015

(65) Prior Publication Data
US 2016/0251519 A1    Sep. 1, 2016

(30) Foreign Application Priority Data

Oct. 10, 2013   (CN) .......................... 2013 1 0470792
Jun. 24, 2014   (CN) .......................... 2014 1 0301378

(51) Int. Cl.
*C09C 1/56*    (2006.01)

(52) U.S. Cl.
CPC ............... *C09C 1/56* (2013.01); *Y02T 10/862* (2013.01)

(58) Field of Classification Search
CPC ........... C08L 21/00; C08K 5/548; C08K 9/06; C09C 1/56
See application file for complete search history.

(56) References Cited

U.S. PATENT DOCUMENTS 3,565,657 A * 2/1971 Rossman .................. C08K 3/04
                                                             106/478
4,732,925 A * 3/1988 Davis ....................... C08K 3/04
                                                             524/425
5,773,504 A * 6/1998 Smith ...................... B29B 7/007
                                                             524/492

FOREIGN PATENT DOCUMENTS

| CN | 1279260 A | 1/2001 |
|---|---|---|
| CN | 1781999 A | 6/2006 |
| CN | 103497357 A | 1/2014 |
| JP | 2007238786 A | 9/2007 |
| WO | WO 2013015224 | 1/2013 |
| WO | WO 2013098838 A2 | 7/2013 |

OTHER PUBLICATIONS

International Search Report in corresponding PCT Application No. PCT/CN2014/085517, dated Nov. 26, 2014.

* cited by examiner

*Primary Examiner* — Shuangyi Abu Ali
(74) *Attorney, Agent, or Firm* — Leason Ellis LLP

(57) ABSTRACT

The present invention provides a modified carbon black, with an unsaturated coupling agent being grafted on the surface thereof. An unsaturated double bond on one end of the coupling agent is grafted on the surface of the carbon black to serves as a grafting group; and an active group on the other end serves as a crosslink group to retain a cross-linking function with rubber in the future. At least one coupling agent is selected from sulfur-containing compound, halogen-containing compound, nitrogen-containing compound, polyunsaturated compound. The present invention also provides an energy ball milling preparation method for the described product, and provides the formulas and preparation method of two kinds of sulfur-containing unsaturated coupling agent i.e., thioether and thiuram compounds for the described product. The modified carbon black could be crosslinked together with tire rubber. If the carbon black does not move, the rubber also does not move, thereby improving wet grip and driving safety. If the rubber moves, the carbon black also move, thereby reducing internal friction and saving oil, and reducing heat generated from the tire and prolonging the service life of the tire.

10 Claims, No Drawings

MODIFIED CARBON BLACK AND PREPARATION METHOD THEREFOR

CROSS-REFERENCE TO RELATED PATENT APPLICATIONS

This application is a U.S. National Phase Application under 35 U.S.C. § 371 of International Patent Application No. PCT/CN2014/085517, filed Aug. 29, 2014, and claims the priority of Chinese Application No. 201410301378.5, filed Jun. 24, 2014 and Chinese Application No. 201310470792.4, filed Oct. 10, 2013, all of which are incorporated by reference in their entireties. The International Application was published on Apr. 16, 2015 as International Publication No. WO 2015/051683 A1.

FIELD OF THE INVENTION

The present invention relates to a modified carbon black and preparation method therefor, particularly to a modified carbon black and the sulfur-containing unsaturated coupling agents especially for the modification of carbon black, as well as the preparation methods therefor.

BACKGROUND ARTS

Englishman Matt created the rubber reinforced with carbon black in 1904. Early in 1971, It was disclosed by U.S. Pat. No. 3,620,792 owned by Cabot Company that a modified carbon black technology. Although many multinational companies have filed numbers of patent applications for the modification of carbon black, none of the carbon black modification technologies has achieved commercial success in 42 years since then. It was disclosed in U.S. Pat. No. 6,158,488 filed by Goodyear Tire & Rubber Company in 2000 that a silane coupling agent is used to modify carbon black under the atmosphere of nitrogen gas at a temperature of 800° C. A carbon black modified with vinyl monomers was disclosed by CN00117233.6 published in 2001. Jia Demin, etc. grafted maleic anhydride onto carbon black in solid phase in situ at the nylon 66/rubber interface. (Rubber Chemical Technology" 2002, v. 75, p. 669) It was disclose in JP2002322388 owned by Tokai Carbon Co. Ltd. that the carbon black surface was activated by oxidation to produce carbonyl radical for the reaction with vinyl isobutyl ether. It was described in U.S. Pat. No. 6,444,727 owned by Bridgestone Corporation the use of phenol and sulfur-containing silane coupling agent modifying carbon black in gas phase in vacuum. It was described in U.S. Pat. No. 6,652,641 owned by Yokohama Rubber Company the use of sulfur-containing silane coupling agent and silica dispersed in water modifying carbon black. You Zhangjiang, etc. prepared butyl acrylate modified carbon black in 2003. ("Synthetic Rubber Industry" 2003, v. 26, No. 3) Jiang Qibin, etc. used an unsaturated hydroxyl fatty acid to modify carbon black in 2004. ("Elastomer" 2004, 14 (3) 18-22) It was described in JP2005068244 owned by Yokohama Rubber Company the modification of carbon black in an emulsified phase with a polysiloxane containing at least one alkoxy radical and one allyloxy radical. It was disclosed by U.S. Pat. No. 7,300,964 the modification of carbon black with a succinic amide substituted with a thiocyanate in 2007. It were disclosed in CN200680046610.9, CN200780053081.x, JP2007269947 and US20100120997 owned by Tokai Carbon Corporation the modification of carbon black using isocyanates. It was disclosed in JP2009035696 owned by Asahi Carbon Black Company the modification of carbon black using mercapto radical of organic acids. It was described in "Modified Carbon Black and Viscoelastic Properties of Rubber", published on "International Rubber Business" 2010, No. 11, p 29, the modification method of carbon black using dicumyl peroxide and long chain fatty acid. The various techniques mentioned above are still in the laboratory stage for various reasons, not yet on the market. Creative research and development are urgently needed.

The consumption of carbon black for tire accounts for ⅔ of its world production. As sulfur vulcanization system is extensively used for tire rubber, it is needed to develop coupling agent used specially for sulfur vulcanization system to couple carbon black with rubber. Until now, the concept of unsaturated coupling agent, in particular sulfur-containing unsaturated coupling agent, had not yet been proposed.

SUMMARY OF THE INVENTION

The object of the present invention is to provide a modified carbon black as a reinforcing agent to improve the physical and mechanical properties of rubber, in particular to improve the dynamic mechanical properties of tire.

Another object of the present invention is to provide a convenient preparation method for preparing the said modified carbon black.

Still another object of the present invention is to provide two kinds of products of sulfur-containing unsaturated coupling agent applying for the said modified carbon black.

Further object of the present invention is to provide the method for preparing the above mentioned two kinds of products of sulfur-containing unsaturated coupling agents.

Even further object of the present invention is to provide the use of the said modified carbon black in rubber products.

The technical solution of the present invention is a modified carbon black, which surface is grafted with an unsaturated coupling agent. One end of the unsaturated coupling agent is an unsaturated double bond serving as graft radical for the carbon black, and the other end of that is a reactive radical serving as crosslink radical, retaining the function of crosslink with rubber in the future, wherein said unsaturated coupling agent is at least selected from one member among sulfur-containing compounds having crosslink radical, halogen-containing compounds having crosslink radical, nitrogen-containing compounds having crosslink radical and polyunsaturated compounds having crosslink radical, and said unsaturated coupling agent grafted on carbon black accounts for 0.2% to 20% of the total weight of the modified carbon black; such modified carbon black may be prepared by an energy ball milling method, whereby the carbon black surface is activated by energy and thence grafted with said unsaturated coupling agent.

A method of the present invention for preparing modified carbon black and for preparing co-modified carbon black and silica, characterized in that the use of energy ball milling. The method is suitable both for modifying carbon black and co-modifying carbon black and silica. The method comprised the following steps:

(a) an unsaturated coupling agent having reactive radicals at both ends is added into carbon black and mixed well, which is at least selected from one member among sulfur-containing compounds, halogen-containing compounds, nitrogen-containing compounds and polyunsaturated compounds, together with or without zinc oxide, silica, sulfur-containing silane coupling agent, dispersing agent, antioxidant and scorch retarder;

(b) these ingredients are introduced into a ball milling equipment, being pulverized and coated onto the carbon black particles while ball milling in a state of powder. The temperature is raised naturally and is controlled no more than 105° C., so that the unsaturated radical at one end of the coupling agent is grafted onto the carbon black surface, retaining the activity of the crosslink radical at the other end of the unsaturated coupling agent for crosslinking with rubber in the future, (c) the intended product is obtained after sieving and dehydration at the temperature of 105° C.

There are two technical solutions of the present invention for two novel products of sulfur-containing unsaturated coupling agents, represented respectively by the following formula (1) of thioether and formula (2) of thiuram compound, both specially utilized for said modified carbon black:

(1)

$$R-S_A-R \quad (1)$$

wherein R stands for cyclohexenyl radical or vinylphenyl radical or vinylbenzyl radical;

A stands for the integer from 2 to 4.

(2)

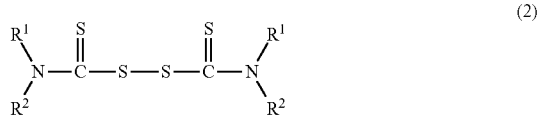

wherein, $R^1$ and $R^2$ stand for alkenyl radicals having 2 to 4 carbon atoms, and $R^2$ may stand for phenyl radical or benzyl radical as well.

The present invention has thirteen characteristics as follows:

The first characteristic of the present invention is the modification of carbon black through using an unsaturated coupling agent with reactive radicals at its two ends. One end of which is a functional radical to be grafted onto carbon black, or graft radical for short, and the other end of which is a functional radical to crosslink with rubber in the future, or crosslink radical for short. The definition of an unsaturated coupling agent of the present invention is a compound having an unsaturated double bond at one end functioning as graft radical for carbon black, and a reactive radical at the other end functioning as crosslink radical for rubber. Any compounds having unsaturated double bond which does not function as graft radical for carbon black can not be referred to as an unsaturated coupling agent. The classification of coupling agent is based on its functional radical grafted onto the fillers.

Particularly, the graft radical is an unsaturated double bond radical. As the mechanism of the graft reaction is not very clear yet, the preliminary view is that it is a condensation reaction and alkylation reaction between the unsaturated double bond radical of said coupling agent and the unsaturated double bond radical at the carbon black surface activated by energy, forming a carbon-carbon covalent bond.

There are many kinds of said crosslink radical, including sulfur-containing radical, halogen-containing radical, nitrogen-containing radical, and alkenyl radicals. The function of said crosslink radical retained on the carbon black surface is to crosslink with rubber in the future at a higher temperature of vulcanization stage. These crosslink radicals are commonly used in vulcanization systems of rubber, and their functions and effects are well known by a skilled person in the art. Subsequent crosslink reaction in the future changes the relationship of physical contact between carbon black and rubber into the relationship of chemical bonding, bringing about the integration of modified carbon black into rubber elastic network. As the modified carbon black moves along with rubber molecules, the internal friction between them is reduced, thereby reducing the compression heat and rolling resistance of the tire rubber in dynamic state. In another aspect, as the modified carbon black stands along with rubber molecules, the wet grip performance of tire is improved. It is especially important that the application of said modified carbon black to tire allows the reduction of compression heat, the prolongation of tire life, the save of fuel consumption, the decrease of exhaust gas emissions, the improvement of wet grip performance and the improvement of drive safety. This is the most important aim of the subject invention.

Based on the various natures of vulcanization systems of rubber, crosslink radicals and their corresponding unsaturated coupling agent (UCA) are selected according to their crosslink function with rubber within the vulcanization system in the future.

1. Sulfur-containing UCA as well as guanidine UCA can be chosen for sulfur vulcanization system. The term "can be chosen" means a choice, not a limit. It is the same as below.
2. Halogen-containing UCA as well as thiourea UCA can be chosen for metal oxide vulcanization system,
3, Nitrogen-containing UCA, including amine UCA and guanidine UCA, can be chosen for polyamine vulcanization system, polyisocyanate vulcanization system and epoxy vulcanization system,
4, Polyunsaturated coupling agent can be chosen for sulfur vulcanization system, peroxide vulcanization system, quinone oxime vulcanization system and maleimide vulcanization system.

Due to the large surface area of carbon black, UCA grafted on it accounts for 0.2% to 20% of the total weight of the modified carbon black.

The second characteristic of the present invention is using energy ball milling method for modification of carbon black. Energy ball milling method, also called high-energy ball milling method, is commonly used in powder metallurgy. The original high temperature of the preparation method required to fuse various metals together is greatly cut down by using energy ball milling method. The fusing of the various metals is achieved at a much lower temperature under mild conditions. The present invention introduces it as a modification technology for carbon black.

In the present invention, the energy ball milling method has two implications. One is the activation of carbon black surface, which promotes its unsaturated bonds to interact with unsaturated bonds of UCA, forming carbon-carbon bonds and accomplishing its modification. Essence of the energy ball milling method is that the kinetic energy of milling balls is transmitted to the micro areas of carbon black surface impacted, and the energy is highly concentrated onto the micro areas, causing defects of the crystalline structure of carbon black surface, activating the high energy portions, generating unsaturated electric charges and inducing graft reaction instantly without any initiator. It is implemented in powder state and does not require filtering and drying processes. Energy ball milling process does not require heating, and should not be, heated. In laboratory, temperature rises up to 60° C.~90° C. naturally by milling. The temperature may be much higher than 100° C. during mass production, which should be controlled no more than 105° C. Most importantly, under the mild conditions of temperature no more than 105° C., ball milling is enough to make defects of the crystalline surface, causing the graft reaction of graft radicals of UCA, but not enough to trigger the interaction between the crosslink radicals of UCA and the unsaturated double bonds at the carbon black surface, so that the activity of crosslink radicals of UCA could be retained and subsequently released in the crosslink reaction with rubber in the future under the higher temperatures of vulcanization stage. This is the key point for preparing the product of the present invention successfully.

Another implication of the energy ball milling method is the fragmentation of carbon black aggregates, meanwhile preventing their re-aggregation. Carbon black aggregates can easily be disassembled, but it can easily re-aggregate too. As carbon black aggregates are fragmentized apart by the kinetic energy of the milling balls, their surface should be instantly grafted with UCA and isolated simultaneously. This kind of method, i.e. carrying out fragmentation and isolation simultaneously, is the only way to fragment carbon black aggregates, with which other kind of modified methods could not match. In the kneading process with rubber, the modified carbon black particles could not aggregate again and remain highly dispersive. The ball milling can fragment carbon black aggregates, but not primary particles of carbon black. Hence the specific size of modified carbon black particles depends upon their primary particle size and the amount of UCA grafted onto it. The carbon black aggregates modified by energy ball milling method appear to be equiaxis shaped, fragmented, highly dispersed and closely contacted with rubber in the rubber compound. Both fragmentation and dispersion of carbon black improve the reinforcing properties of rubber inevitably.

Energy ball milling method is equally applicable to the modification of silica at a mild temperature no more than 105° C. The impact of milling balls is enough to graft sulfur-containing silane coupling agent onto the surface of silica, but not enough to trigger the reaction between the sulfur active radical of silane coupling agent and the unsaturated double bonds of coexist carbon black. This method can also promote the fragmentation of silica aggregates. Therefore, the energy ball milling method is equally applicable to the co-modification of carbon black and silica.

The third characteristic of the present invention is that zinc oxide could be added together with sulfur-containing UCA to the carbon black surface and react with the sulfur radical of UCA, forming zinc salt of the UCA in situ and hence blocking up reactions between the sulfur radical of UCA and the unsaturated double bonds of carbon black, retaining the activity of the sulfur radical to crosslink with rubber in the future. This kind of blocking mechanism is a complementary measure for avoiding the participation of sulfur radical reaction in the modification process of carbon black under the temperatures lower than 105° C. At an higher temperature, the zinc-sulfur bonds break down and lose its blocking mechanism. So, adding zinc oxide is a supplementary measure to avoid sulfur-containing radical taking part in the reaction while the carbon black being modified.

In the occasion that the present of sulfur-containing UCA and organic acids serving as dispersant, zinc oxide may react with the sulfur-containing UCA and the organic acids, connecting the sulfur-containing UCA and the organic acids together and coating the carbon black aggregates all around. Thus the dispersion of carbon black is improved. In the subsequent vulcanization process in the future, highly dispersed zinc could crosslink with rubber in the form of ionic bonds directly or via sulfur atoms, thereby improving the flexibility and heat exhalation of the rubber.

The fourth characteristic of the present invention is that zinc oxide and silica may be added and form in situ zinc salt of sulfur-containing UCA and zinc silicate at the carbon black surface, thereby connecting the carbon black and silica together, spreading the silica around the modified carbon black aggregates and constituting a modified carbon black covered with silica, consequently improving the dispersion of silica and the wet grip performance of tire.

The fifth characteristic of the present invention is the co-modification of carbon black and silica. Carbon black and silica have many properties in common as follows: the approximate diameters of their primary particles, easily aggregating as well as easily disassembled properties of their amorphous aggregates, being modified by sulfur-containing coupling agents and being utilized as reinforcing agents for rubber. These properties provide the practical basis of their co-modification.

As for the rubber products using sulfur vulcanization system, carbon black and silica may be blended together and coated with sulfur-containing UCA, sulfur-containing silane coupling agent and zinc oxide, forming in situ zinc salt of sulfur-containing UCA and zinc salt of sulfur-containing silane coupling agent respectively at their surfaces via zinc-sulfur bonds accomplishing their co-modification. These two coupling agents mentioned above are grafted respectively onto the surfaces of carbon black and silica, thereby connecting carbon black, silica and zinc oxide together. In the process of ball milling, zinc oxide is firstly dispersed apart by the pulling forces of carbon black and silica. Then, in the occasion that the amount of sulfur-containing UCA molecules exceeds that of sulfur-containing silane coupling agent molecules, one silica aggregate is split to two or more aggregates under the pulling forces of two or more carbon black aggregates, thereby forming carbon black surrounded by silica. On the contrary, in the occasion that the amount of sulfur-containing silane coupling agent molecules exceeds that of sulfur-containing UCA molecules, one carbon black aggregate is split to two or more aggregates under the pulling forces of two or more silica aggregates, thereby forming silica surrounded by carbon black. Carbon black, silica and zinc oxide may be mixed together in any proportion and their co-modification can improve their dispersion respectively while zinc oxide is partly or totally converted to zinc salt.

In the subsequent kneading and vulcanization processes in the future, the bonds between zinc and sulfur-containing UCA and those between zinc and sulfur-containing silane coupling agent are broken down under higher temperatures, thus the carbon black aggregates and silica aggregates can be highly dispersed in rubber to enhance the reinforcing effect.

The sixth characteristic of the present invention is that various dispersants, antioxidants and scorch retarders may be coated onto the external sides of the UCA, which in turn is coated onto the carbon black surface. It means that carbon black may be mixed with silica, UCA, silane coupling agent, zinc oxide, dispersants, antioxidants and scorch retarders beforehand, and then be modified by ball milling method.

Under the circumstance, antioxidants and scorch retarders play the role of dispersant in addition to their inherent roles.

Most crosslink radicals of UCA are mostly polar radicals, which on the one hand may easily cause carbon black particles to be agglomerated, and on the other hand are not well compatible with rubber. Therefore coating dispersants around the external sides of UCA is favorable.

Zinc oxide is adequate to be coated onto the external sides of sulfur-containing UCA. Furthermore, fatty acids, aromatic acids, cyanuric acid and trithiocyanuric acid, preferably cyanuric acid, may be coated onto the external sides of zinc oxide as dispersants. Alternatively, amine compounds are used as dispersants being directly coated onto the external sides of sulfur-containing UCA. Amine compounds may be selected from one member among aliphatic amines, cyclohexylamine, di-hexylamine, dicyclohexylamine, anti-oxidant amines and scorch retarder amines, including dicyclohexylamine which has the function of improving the flexibility and aging resistance of rubber.

In addition, phenolic antioxidants are adequate to be coated onto the external sides of nitrogen-containing UCA and zinc alkynoate UCA as dispersants.

The seventh characteristic of the present invention is to select sulfur-containing unsaturated compounds as UCA, wherein the sulfur-containing radical is the crosslink radical for sulfur vulcanization system. Because most conventional rubber products are manufactured under sulfur vulcanization system, these compounds are the most important UCA.

At least one of the sulfur-containing UCA is selected from following compounds having crosslink radical: thioethers, thioureas, thiurams, dithiocarbamates or dithiophosphates. At least one of the sulfur-containing UCA is selected among dialkene S2 to S4 sulfides, dialkenyl cyclohexane S2 to S4 sulfides, dialkenyl benzene S2 to S4 sulfides, dialkenyl toluene S2 to S4 sulfides, bis(divinylthiophosphinylidyne) S3 sulfides, dialkenyl thioureas, dialkenyl phenyl thioureas, tetraalkenyl thiuram S2 to S4 sulfides, dialkenyl dithiocarbamic acids, dialkenyl dithiocarbamates, dialkenyl diphenyl dithiocarbamic acids, dialkenyl diphenyl dithiocarbamates, dialkenyl dithiophosphoric acids, bis(dialkenyl phosphorodithioates) and dialkenyl phosphorodithioates, as well as the zinc salt or the ammonium salt of the aforesaid compounds, wherein S stands for sulfur atom.

The eighth characteristic of the present invention is to provide two kinds of sulfur-containing UCA specialised for the modification of carbon black, which are thioether compounds and thiuram compounds represented respectively by the aforesaid chemical formulas (I) and (2). The common characteristics between them are as follows: a, both have unsaturated double bond for graft onto the carbon black surface; b, both have sulfur radical for crosslink with rubber under sulfur vulcanization system; c, both can meet the requirement of Mooney viscosity, scorch time and curing rate in the vulcanization process of rubber. d, both can be prepared at temperatures below 95° C. avoiding the reaction between its own sulfur radical and its own unsaturated double bond; e, both without volatility or little volatility avoiding the bad smell during the kneading and vulcanization processes of rubber. f, both without toxicity or although little toxicity under dissociation, it is not easy to be dissociated while being grafted onto the carbon black surface, or not easily oxidized to nitrosamine under the protection of reduced carbon black, or no harm to people.

The ninth characteristic of the present invention is two kinds of preparation methods respective for two novel categories of sulfur-containing UCA. In fact, these two kinds of preparation methods are essentially similar to the existing preparation methods of corresponding categories, and the differences only lie in a portion of raw materials. The concrete preparation methods are as follows:

1, The preparation method of thioether compounds represented by the chemical formula (1) which is essentially similar to the existing preparation method for preparing dialkenyl polysulfides. The main difference lies in inserting cyclohexenyl radical or vinylphenyl radical or vinylbenzyl radical in order to minimize the bad garlic-like smell and ameliorate the environments of kneading and vulcanization processes.

This method comprises the following sequence of steps:
a, 1-chloro cyclohexene or 3-chloro cyclohexene or 3-chlorostyrene or 4-chlorostyrene or 3-chloromethyl styrene or 4-chloromethyl styrene is added into aqueous solution containing sodium polysulfide;
b, These ingredients are subjected to stirring at the temperature below 75° C. to carry out double decomposition reaction; preferably 5° C. to 30° C.
c, After the organic layer of the above reaction medium is isolated and filtered, the intended product of dicyclohexenyl S2 to S4 sulfide compounds or divinylphenyl S2 to S4 sulfide compounds or divinylbenzyl S2 to S4 sulfide compounds is obtained, wherein S stands for sulfur atom.

2, The preparation method of thiuram compounds represented by the chemical formula (2) which is essentially similar to the existing preparation method for preparing saturated thiuram compounds. The difference lies in that the saturation level of the raw materials This method comprises the following sequence of steps:
a, Diene amine or N-allylaniline or N-allylbenzylamine is added into aqueous solution containing sodium hydroxide;
b, While these ingredients are subjected to stirring at the temperature below 75° C., preferably 10° C. to 45° C., carbon disulfide is added drop by drop to carry out condensation reaction until the pH value remains constant, then the resulting liquid is sodium dialkenyl dithiocarbamate;
c, While the above reaction solution is subjected to stirring, the aqueous solution containing sodium nitrite is added drop by drop and then filtered once it is dissolved;
d) The above reaction solution is introduced into an oxidation reactor, and hydrogen peroxide or dilute sulfuric acid is added drop by drop to carry out oxidation reaction in the atmosphere of air aerated at a temperature of about 8° C., then the reaction product is precipitated out in solid state;
e) After filtering, washing, dehydration and sieving, the intended unsaturated coupling agent, i.e. tetraalkenyl thiuram disulfide or dialkenyl diphenyl thiuram disulfide or dialkenyl dibenzyl thiuram disulfide is obtained.

The tenth characteristic of the present invention is to choose a halogen-containing unsaturated compounds as the coupling agent, wherein the halogen-containing radical is a crosslink radical for rubber products of metal oxide vulcanization system, including chloroprene rubber, epichlorohydrin rubber, chlorinated polyethylene rubber, chlorosulfonated polyethylene rubber, chlorinated ethylene-propylene rubber, 1,2-epoxy-3-chloropropane rubber, halogenated butyl rubber and the like.

Halogen-containing UCA is at least selected from one member among chlorinated alkenes, chlorinated cycloalkenes, 4-chlorostyrene, chloromethyl styrene, vinylbenzyl chloride, hexachlorocyclopentadiene, dibromostyrene, tribromostyrene, tribromophenyl alkenyl ether, tribromophenyl alkenoates, tetrabromo-phthalic dialkenyl esters, tetrabromobisphenol A monoalkenyl ether, tetrabromobisphenol AF monoalkenyl ether, tetrabromobisphenol S monoalkenyl ether, and bis (dibromopropyl) fumarate, wherein the bromine-containing compounds are primarily for bromobutyl rubber.

The eleventh characteristic of the present invention is to choose a nitrogen-containing unsaturated compounds as coupling agents, wherein the nitrogen-containing radical is a crosslink radical for rubber products of polyamine or guanidine vulcanization system, including amine compounds, and guanidine compounds, wherein the amino radical or guanidine radical is the crosslink radical for rubber products of polyamine vulcanization system, polyisocyanate vulcanization system and epoxy vulcanization system, including polyacrylate rubber, ethylene-propylene rubber, chlorinated polyethylene rubber, chlorosulfonated polyethylene rubber, epichlorohydrin rubber, carboxyl rubber, liquid polybutadiene rubber with end halogen radical and polyurethane rubber. Guanidine UCA may also be used for rubber products of sulfur vulcanization system together with sulfur-containing UCA.

Amine UCA is at least selected from one member among alkenyl amines, dialkenyl amines, trialkenyl amines, N-methyl dialkenyl amine, N,N-dimethyl alkenyl amines, cycloalkenyl amines, cycloalkenyl diamines, amino-styrenes, vinyl-diamino-triazines, N,N'cinnamyl-1,6-hexanediamines, divinylmethylenyl bisortho-chloroanilines; wherein the tertiary amine compound is utilized to crosslink with the halogen-containing radical of rubber via an ionic bond forming quaternary ammonium salt.

At least one of the guanidine UCA is selected from N,N' divinyl phenyl guanidines or N,N' diallyl phenyl guanidines.

The twelfth characteristic of the present invention is to choose polyunsaturated compounds containing two discrepant unsaturated double bonds or three or more unsaturated double bonds as the coupling agent for rubber products of sulfur vulcanization system, peroxide vulcanization system, quinine oxime vulcanization system and maleimide vulcanization system, including almost all of the rubber variety, except butyl rubber and a few other highly saturated rubbers. Taking dicyclopentadiene as an example, the 9-double bond is the graft radical because of its strong activity; and the 1-double bond is the crosslink radical because of its weak activity, the 1-double bond is reserved to the future as an active center to crosslink with rubber through its allylic hydrogen. As far as an UCA containing more than three unsaturated double bonds, one or two unsaturated double bonds can be used as the graft radicals and other one or two double bonds can be used as the crosslink radicals.

At least one of the polyunsaturated coupling agents is selected from alkenyl cyclohexene, limonene, 1,4-hexadiene, dicyclopentadiene, ethylidene norbornene, norbornadiene, myrcene, tetraallyloxy ethane, cyclododecatriene, dialkenyl maleate, trialkenyl benzenetricarboxylates, trialkenyl cyanurate, trialkenyl phosphate, trihydroxymethyl propane trialkenyl ester, pentaerythritol trialkenyl ether, tetraalkenyl diphenylmethane diamines, N-alkenyl maleimide or N-alkenoxy phenyl maleimide.

The thirteenth characteristic of the present invention is combining several kinds of UCA together, and the combination of several kinds of compounding ingredients together. The compounding ingredients refer to zinc oxide, dispersants, antioxidants and anti-scorching agents. According to the prior art of rubber, it is usually to use a variety of curing agents and accelerators together. Accordingly, for a kind of modified carbon black, a variety of UCA and a variety of compounding ingredients may be coated onto its surface together with. For examples, dicyclohexene trisulfide and zinc diallyl dithiophosphate may be coated together with, as well as zinc diallyl dithiocarbamate and divinylbenzene guanidine may be coated together with onto the carbon black surface in order to regulate the scorch time. The use of a variety of UCA together with must bring about the use of a variety of compounding ingredients together with.

The products of the present invention constitute a series of a variety of modified carbon black, including a variety of chemical structures. In the cases of rubber/rubber co-modification and rubber/plastic co-modification, a variety of modified carbon black can be used together with. The modified carbon blacks in rubber products present common structural characteristics as follows: fragmentation of carbon black aggregates, carbon black relatively uniformly incorporated into the network of rubber, increase in the amount of combined rubber, as well as the corresponding performance characteristics presented as increased flexibility, reduced compression heat, enhanced reinforcing effect and improved processing performance.

In summary, the key words of the present invention are as follows:

carbon black+unsaturated coupling agents+compounding ingredients+energy ball milling, as well as the co-modification of carbon black and silica.

An energy ball milling method is used for preparing both modified carbon black and co-modified carbon black and silica of the present invention. One of the core concept of the method is to coat the UCA by milling and coating simultaneously. Because it is necessary to isolate the carbon black particles with coated UCA while using a mechanical force to disassemble carbon black aggregates in order to prevent the particles from reunioning and to micronize the carbon black. As for silica aggregates, it is also to coat the silane coupling agent by milling and coating simultaneously.

The method for preparing both modified carbon black and co-modified carbon black and silica comprises the following steps:

Step (a): An UCA is added in carbon black blending evenly with an mixing equipment, such as amalgamator, kneader, etc. At least one of the UCA is selected from one member among sulfur-containing compounds, halogen-containing compounds, nitrogen-containing compounds, and polyunsaturated compounds.

Step (b), These ingredients are introduced into a ball milling equipment, and then pulverized and coated simultaneously onto the carbon black in powder state. Ball milling and coating can be accomplished in ultra-fine ball milling equipments, such as ball mill, planetary ball mill, stirred mill, column mill, vibration mill, etc. Milling medium is preferably less than 6 mm in diameter, and the weight ratio of grinding balls and the grinded material is from 3:1 to 15:1. The speed of rotation depends upon the type of the mill, its size and the nature of the material. The speed of rotation should not be too fast, so as to keep the materials in powder state, and not to cause a lot of material knotted. Low speed of rotation is time-consuming, and high speed of rotation is time-saving. Intense milling will naturally heat up, no additional heating is needed. It is necessary to control the batch temperature below 105° C. Air cooling or water cooling can be used to control the temperature of the mill shell, in order that the unsaturated radical at one end of UCA can be grafted onto the carbon black surface, as well as the silanol radical of sulfur-containing silane coupling agent can be grafted onto the surface of silica, meanwhile avoiding the sulfur-containing radical at the other end of these coupling agents involved into the graft reaction, retaining their activity to crosslink with rubber in the future.

In the laboratory, after the step (a) and (b), the materials need to go through the step (c), sieved and heated at 105° C. for dehydration. In scale production, the modification of carbon black can be inserted into the conventional production line of carbon black, i.e. after carbon black is produced from the reaction furnace and cools down, the modification process or co-modification process using energy ball milling can be immediately implemented, and then followed by the conventional steps of production, i.e. grading, granulation and dehydration at 105° C. The UCA at the carbon black surface is helpful for the granulation. The dehydration process helps UCA firmly grafted onto the carbon black surface, as well as silane coupling agent firmly grafted onto the surface of silica. This method does not produce any kind of "the three wastes" (waste gas, waste water and industrial residue).

The research and development works of the aforesaid modification technology were supported by silica trials of Shanghai Rubber Products Institute of Huayi Group in 2008, by modified carbon black test data of Shanghai Tire Institute of Double Coins Group from 2009 to 2011, by modified carbon black test data of LingLong Tire Company in 2012 and by modified carbon black test data of ZhongCe Rubber Group in 2013. The application of modified carbon black for tire rubber has got breakthrough by way of successive tests and improvements. The application results are shown in Table 1, wherein the dynamic mechanical data DMA is greatly improved, the Tan δ (60° C.) indicating rolling resistance is reduced and the Tan δ (0° C.) indicating wet grip performance is improved, illustrating this technology really has the benefits of reducing fuel consumption and improving wet-skid resistance. This is just the most preliminary application results. As a pioneering basic invention, it has great potential for improvement and development, awaiting to be supported for carrying out follow-up research, promotion and application.

TABLE 1

Preliminary application results of modified carbon black N234 in tire rubber compound

|  | Normal carbon black N234 | Modified carbon black N234 |
| --- | --- | --- |
| Mooney viscosity ML (1 + 4) 105° C. | 97.56 | 76.31 |
| Mooney scorch T5 (127° C.)/min | 13:34 | 17:17 |
| Curelastometer T90 (185° C.*3 min)/min | 02:01 | 02:16 |
| Hardness | 69 | 68 |
| 300% stretch stress, MPa | 14.59 | 12.12 |
| Tensile strength, MPa | 19.50 | 20.05 |
| Elongation at break, % | 434 | 578 |
| Tear strength, KN/M | 79.08 | 78.51 |
| Hardness after aging at 100° C. | 72 | 73 |
| 300% stretch stress after aging at 100° C., MPa | 13.96 | 14.08 |
| Tensile strength after aging at 100° C., MPa | 15.33 | 16.04 |
| Elongation at break after aging at 100° C., % | 324 | 435 |
| Tear strength after aging at 100° C., KN/M | 67.63 | 70.17 |
| 25° C. rebound, % | 52 | 56 |
| DIN abrasion, cm3 | 0.1832 | 0.1809 |
| DMA-Tan δ (0° C.) | 0.6047 | 0.6607 |
| DMA-Tan δ (60° C.) | 0.1402 | 0.1274 |

Note:
The compound formulas are as follows: For normal sample, 100 parts of natural rubber, 30 parts of Cabot Company's carbon black, 50 parts of silica. For modified sample, 100 parts of natural rubber, 33 parts of Jinneng Company's carbon black modified and 50 parts of silica. Due to UCA occupying a certain weight, it is needed to increase the amount of the filler.

DETAILED DESCRIPTION OF THE INVENTION

The specific embodiments of the present invention can be further clearly understood by the implement examples given below, but they are by no means of limitation of the present invention. Laboratory experiments were conducted in a teflon-lined stirred ball mill of 2 L volume with 1 kg agate balls 6 mm in diameter. During the milling processes, the samples were turned over three times.

Example 1

40 ml of 25% aqueous sodium polysulfide solution was introduced into 26 ml of chloro-cyclohexene. The mixture was stirred at the temperature of 20° C., and 80 ml of 25% aqueous potassium ferricyanide solution was added group by group to carry out double decomposition reaction for 2.5 hours. After the organic layer of the above reaction medium was isolated and filtered, the intended product of dicyclohexenyl disulfide was obtained and utilized as an UCA for the modification of carbon back.

Example 2

25 ml of diallyl amine was added into 62 ml of 15% aqueous sodium hydroxide solution. The mixture was stirred at the temperature of 35° C. and 14 ml of carbon disulfide was added drop by drop to carry out condensation reaction for 5~7 hours until the pH value of 9~10 remains constant obtaining the recovered liquid sodium diallyl dithiocarbamate. While the above reaction solution was subjected to stirring, 80 ml of 10% aqueous sodium nitrite solution was added drop by drop at room temperature and then filtered once it was dissolved. The above reaction solution was introduced into an oxidation reactor, and 580 ml of 4% dilute sulfuric acid was added drop by drop to carry out oxidation reaction in the atmosphere of air aerated at a temperature of about 8° C., then the reaction product was precipitated out in solid state. After filtering, washing, dehydration and sieving, the intended product of tetraallyl thiuram disulfide was obtained and utilized as an UCA for the modification of carbon back.

Example 3

2.9 ml of dicyclohexenyl trisulfide, 2.2 ml of dially dithiophosphoric acid, 2.2 g of zinc oxide, 2.8 ml of dicyclohexylamine and 0.9 g of cyanuric acid were added in a laboratory stirred mill together with 100 g of carbon black N220. These ingredients were subjected to grinding and coating at the batch temperature below 105° C., and then subjected to sieving through a 100 mesh screen and dehydration 30 minutes at 105° C. The recovered modified carbon black could be filled into natural rubber of sulfur vulcanization system for the manufacturing of tire side rubber, automotive rubber, etc.

Example 4

1.3 ml of dimethylallyl disulfide, 3.2 ml of dially dithiophosphoric acid, 2 ml of bis(triethoxysilylpropyl) disulfide silane coupling agent (Si75), 3.2 g of zinc oxide and 0.8 g of cyanuric acid were added in a laboratory stirred mill together with 100 g of carbon black N234 and 20 g of silica. These ingredients were subjected to grinding and coating at the batch temperature below 105° C., and then subjected to sieving through a 100 mesh screen and dehydration 30 minutes at 105° C. The recovered co-modified carbon black and silica could be filled into natural rubber of sulfur vulcanization system for the manufacturing of tire, etc.

Example 5

5 g of tetraallylthiuram disulfide, 2.8 g of zinc oxide and 0.35 g of cyanuric acid were added in a laboratory stirred mill together with 100 g of carbon black N134. These ingredients were subjected to grinding and coating at the batch temperature below 105° C., and then subjected to sieving through a 100 mesh screen and dehydration 30 minutes at 105° C. The recovered modified carbon black could be filled into styrene-butadiene rubber of sulfur vulcanization system for the manufacturing of tire, etc.

Example 6

5 g of tetraallylthiuram disulfide, 2.8 g of zinc oxide and 0.35 g of cyanuric acid were added in a laboratory stirred mill together with 100 g of carbon black N134 and 5 g of silica. These ingredients were subjected to grinding and coating at the batch temperature below 105° C., and then subjected to sieving through a 100 mesh screen and dehydration 30 minutes at 105° C. The recovered co-modified carbon black and silica could be filled into styrene-butadiene rubber of sulfur vulcanization system for the manufacturing of tire, etc.

Example 7

5 g of tetraallylthiuram disulfide, 1.6 ml of bis(triethoxysilylpropyl) tetrasulfide silane coupling agent (Si69) and 2.8 g of zinc oxide are added in a laboratory stirred mill together with 100 g of carbon black N134 and 20 g of silica. These ingredients were subjected to grinding and coating at the batch temperature below 105° C., and then subjected to sieving through a 100 mesh screen and dehydration 30 minutes at 105° C. The recovered co-modified carbon black and silica could be filled into styrene-butadiene rubber of sulfur vulcanization system for the manufacturing of tire, etc.

Example 8

2.5 g of zinc diallyl dithiocarbamate, 3 g of N,N'-divinylphenylguanidine, 0.8 g of zinc oxide and 0.2 g of cyanuric acid were added in a laboratory stirred mill together with 100 g of carbon black N234. These ingredients were subjected to grinding and coating at the batch temperature below 105° C., and then subjected to sieving through a 100 mesh screen and dehydration 30 minutes at 105° C. The recovered modified carbon black could be filled into natural rubber of sulfur vulcanization system for the manufacturing of tire, etc.

Example 9

6 ml of dially dithiophosphoric acid, 3 ml of ammonium hydroxide and 0.6 g of trithiocyanuric acid were added in a laboratory stirred mill together with 100 g of carbon black N220. These ingredients were subjected to grinding and coating at the batch temperature below 105° C., and then subjected to sieving through a 100 mesh screen and dehydration 30 minutes at 105° C. The recovered modified carbon black could be filled into chlorinated polyethylene rubber and chloroprene rubber of sulfur vulcanization system for the manufacturing of conveying belt, transmission belt, etc.

Example 10

2.6 g of N,N-diallylthiourea and 0.8 g of anti-scorching agent NA were added in a laboratory stirred mill together with 100 g of carbon black N330. These ingredients were subjected to grinding and coating at the batch temperature below 105° C., and then subjected to sieving through a 100 mesh screen and dehydration 30 minutes at 105° C. The recovered modified carbon black could be filled into chloroprene rubber, chlorinated polyethylene rubber, chlorosulfonated polyethylene rubber and epichlorohydrin rubber of metal oxide vulcanization system for the manufacturing of electric wire, cable, etc.

Example 11

5.6 ml of 4-chloro-methylstyrene and 0.8 g of amine antioxidant 4,4'-diamino diphenyl methane were added in a laboratory stirred mill together with 100 g of carbon black N330. These ingredients were subjected to grinding and coating at the batch temperature below 105° C., and then subjected to sieving through a 100 mesh screen and dehydration 30 minutes at 105° C. The recovered modified carbon black could be filled into chloroprene rubber, chlorinated polyethylene rubber, chlorosulfonated polyethylene rubber and epichlorohydrin rubber of metal oxide vulcanization system for the manufacturing of electric wire, cable, etc.

Example 12

2.1 g of N,N-dicinnamylidene-1,6-hexanediamine and 0.6 g of phenolic antioxidant di-tert-butylhydroquinone were added in a laboratory stirred mill together with 100 g of carbon black N550. These ingredients were subjected to grinding and coating at the batch temperature below 105° C., and then subjected to sieving through a 100 mesh screen and dehydration 30 minutes at 105° C. The recovered modified carbon black could be filled into polyacrylate rubber and chlorinated polyethylene rubber of polyamine vulcanization system for the manufacturing of sealing products.

Example 13

100 g of carbon black N330 and 6.7 ml of triallyl isocyanurate was added in a laboratory stirred mill. These ingredients were subjected to grinding and coating at the batch temperature below 105° C., and then subjected to sieving through a 100 mesh screen and dehydration 30 minutes at 105° C. The recovered modified carbon black could be filled into various rubbers of sulfur vulcanization system and peroxide vulcanization system for the manufacturing of tire, electric wire, cable, sealing products, etc.

Example 14

100 g of carbon black N134, 20 g of silica 10.4 g of N-allylmaleimide were added in a laboratory stirred mill. These ingredients were subjected to grinding and coating at the batch temperature below 105° C., and then subjected to sieving through a 100 mesh screen and dehydration 30 minutes at 105° C. The recovered co-modified carbon black and silica could be filled into diene rubbers of maleimide vulcanization system for the manufacturing of tire, footwear, etc.

What is claimed is:

1. A modified carbon black, comprising:
   a surface grafted with an unsaturated coupling agent, said unsaturated coupling agent comprising a first end and a second end,
   wherein the first end is an unsaturated double bond that is a graft radical for the carbon black and the second end is an active radical that is a crosslink radical, said active radical being capable of crosslinking with rubber,
   wherein said unsaturated coupling agent grafted onto the carbon black is 0.2% to 20% of the total weight of the modified carbon black; and
   wherein the unsaturated coupling agent is a tetraalkenyl thiuram S2 to S4 sulfide.

2. The modified carbon black of claim 1, wherein the modified carbon black is prepared by using an energy ball milling method, whereby the carbon black surface is activated by energy and grafted with said unsaturated coupling agent.

3. The modified carbon black of claim 1, characterized in that zinc oxide is added to form zinc salt of said unsaturated coupling agent in situ at the carbon black surface.

4. The modified carbon black of claim 1, characterized in that silica and zinc oxide are added to form zinc silicate and zinc salt of said unsaturated coupling agent in situ at the carbon black surface, hence bringing about the connection between carbon black and silica.

5. The modified carbon black of claim 1, characterized in that the carbon black are mixed and coated with said unsaturated coupling agent, a sulfur-containing silane coupling agent and zinc oxide, to form zinc salt of said unsaturated coupling agent and zinc salt of the sulfur-containing silane coupling agent respectively in situ at the carbon black surface and silica surface, causing co-modification of carbon black and silica.

6. The modified carbon black of claim 1, comprising dispersants that are added at an external side of said unsaturated coupling agent grafted on the carbon black, wherein the dispersants are selected from the group consisting of: fatty acids, aromatic acids, cyanuric acid, amines, phenol antioxidants, amine antioxidants and amine scorch retarders.

7. The modified carbon black of claim 1, characterized in that said unsaturated coupling agent is selected from thiuram compounds of formula (2):

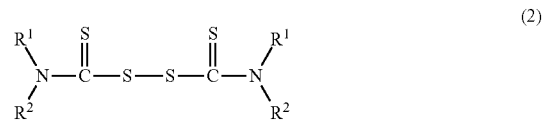

(2)

wherein $R^1$ and $R^2$ is an alkenyl radical having from 2 to 4 carbon atoms.

8. The modified carbon black of claim 7, characterized in that the preparation method of said thiuram compounds of formula (2) comprises the steps of:
   a, adding diene amine to an aqueous solution containing sodium hydroxide to form a mixed solution;
   b, stirring the mixed solution at a temperature below 75° C.,
   c, adding carbon disulfide to the mixed solution;
   d, adding aqueous solution containing sodium nitrite until it dissolves to form a solution;
   e, filtering the solution of step (d);
   f, introducing the solution of step (e) into an oxidation reactor,
   g, adding hydrogen peroxide or dilute sulfuric acid to form a solution;
   e, filtering, washing, dehydration and sieving the solution of step (f) to form tetraalkenyl thiuram disulfides.

9. The modified carbon black of claim 1, wherein the unsaturated coupling agent contains at least one carbon-carbon double covalent bond.

10. The modified carbon black of claim 2, characterized in that said energy ball milling method is conducted at the temperature no more than 105° C. to avoid the reaction between the unsaturated double bonds on the surface of the carbon black and the crosslink radical of said unsaturated coupling agent, so as to retain its activity for crosslink with rubber in the future.

* * * * *